(12) United States Patent
Lee

(10) Patent No.: US 6,590,624 B1
(45) Date of Patent: Jul. 8, 2003

(54) LCD PANELS INCLUDING INTERCONNECTED TEST THIN FILM TRANSISTORS AND METHODS OF GROSS TESTING LCD PANELS

(75) Inventor: Seog-chae Lee, Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 08/957,229

(22) Filed: Oct. 24, 1997

(30) Foreign Application Priority Data

Apr. 11, 1997 (KR) ........................................ 1997-13389

(51) Int. Cl.[7] ............................................. G02F 1/1333
(52) U.S. Cl. ........................................... 349/54; 324/770
(58) Field of Search ........................... 349/54, 192, 139; 324/770

(56) References Cited

U.S. PATENT DOCUMENTS 5,506,516 A * 4/1996 Yamashita et al. .......... 324/753
5,774,100 A * 6/1998 Aoki et al. .................... 345/87
5,994,916 A * 11/1999 Hayashi ....................... 324/500

* cited by examiner

Primary Examiner—Toan Ton
(74) Attorney, Agent, or Firm—Myers Bigel Sibley & Sajovec

(57) ABSTRACT

Test thin film transistors are provided outside of the pixel region of an LCD panel that includes an array of pixel thin film transistors and intersecting arrays of spaced apart data lines and gate lines connected to the array of pixel thin film transistors. A respective test thin film transistor is connected to a respective one of the data lines or gate lines. At least subgroups of the test thin film transistors are commonly connected to provide common energization of subgroups of data lines or test lines for gross testing of the LCD panels. Rubber pads are therefore not required to energize each individual data line or gate line for gross testing. Moreover, after testing is completed, test thin film transistors need not be cut or otherwise mechanically disconnected. Test thin film transistors may be organized for tape automated bonding (TAB) LCD panels or for chip on glass (COG) LCD panels. Associated methods are also provided.

38 Claims, 6 Drawing Sheets

Fig. 1 (Prior Art)
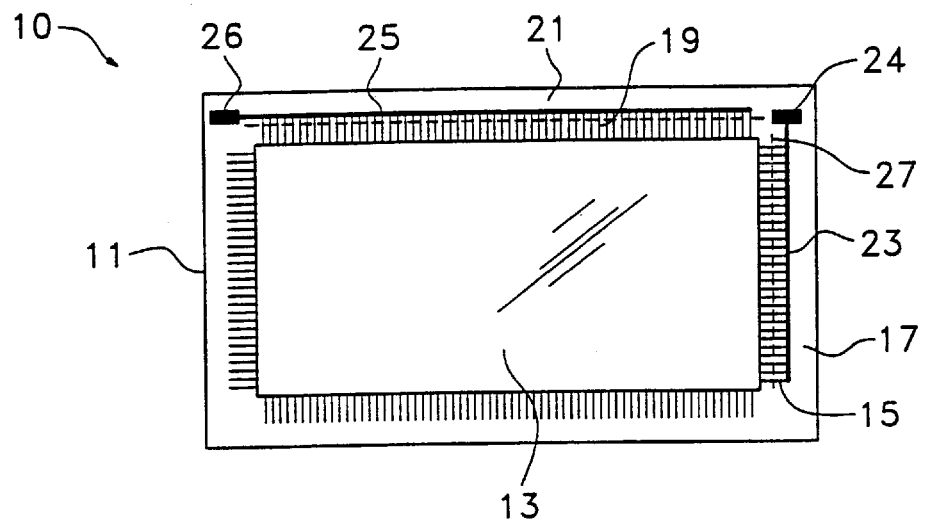
Fig. 2A (Prior Art)
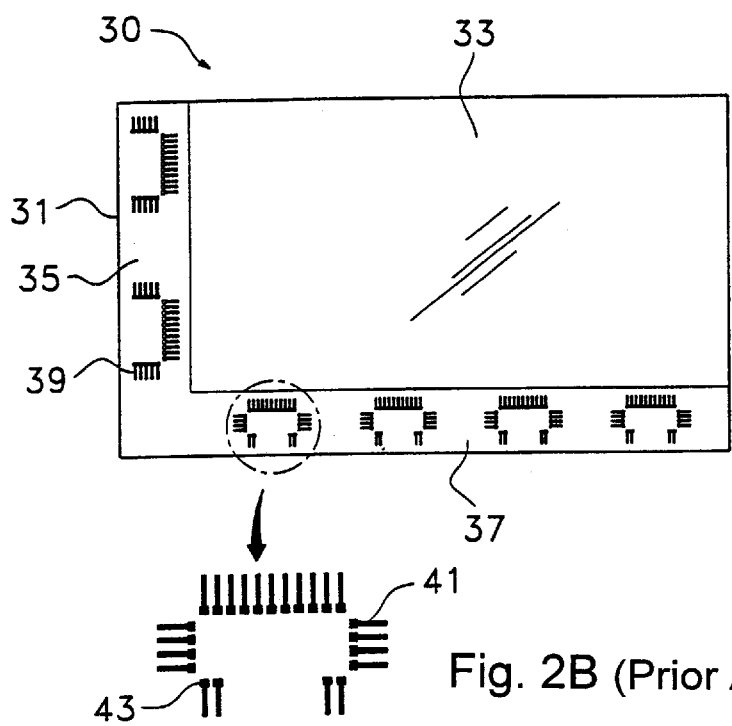
Fig. 2B (Prior Art)

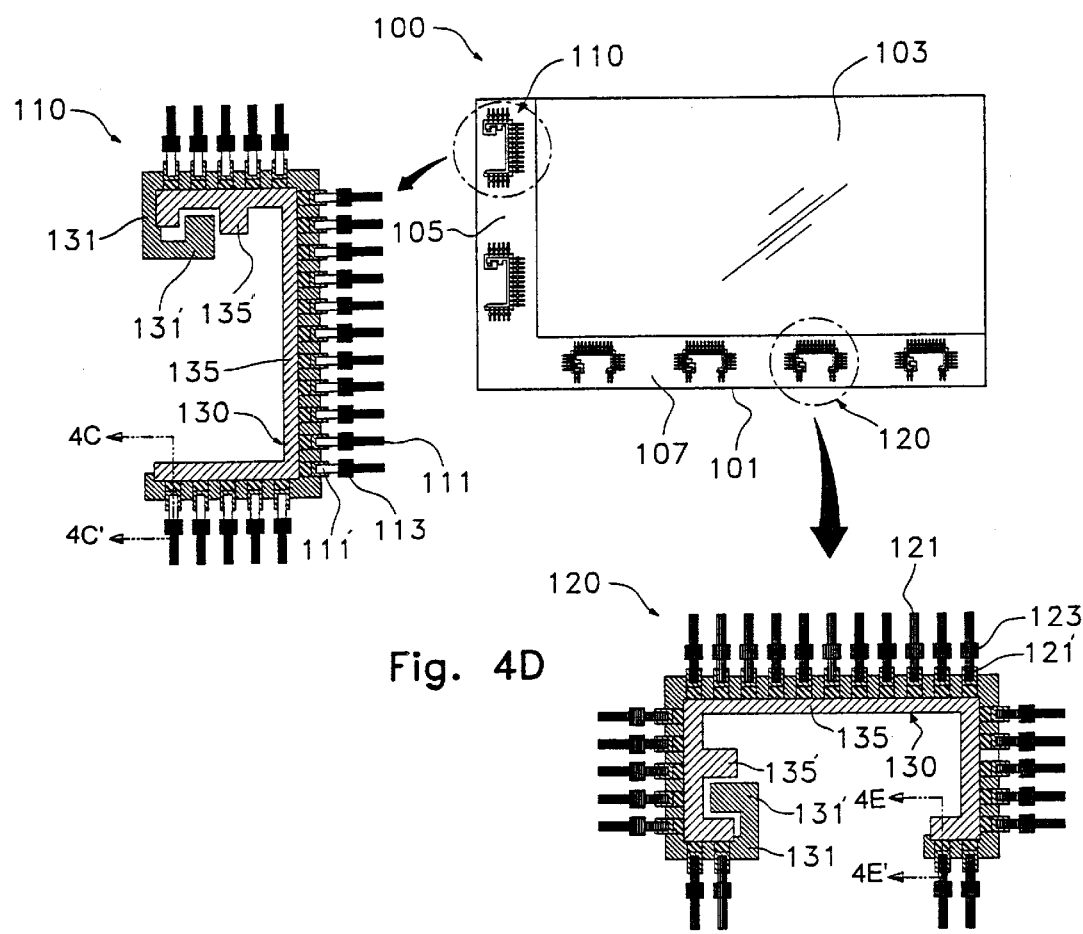

Fig. 5
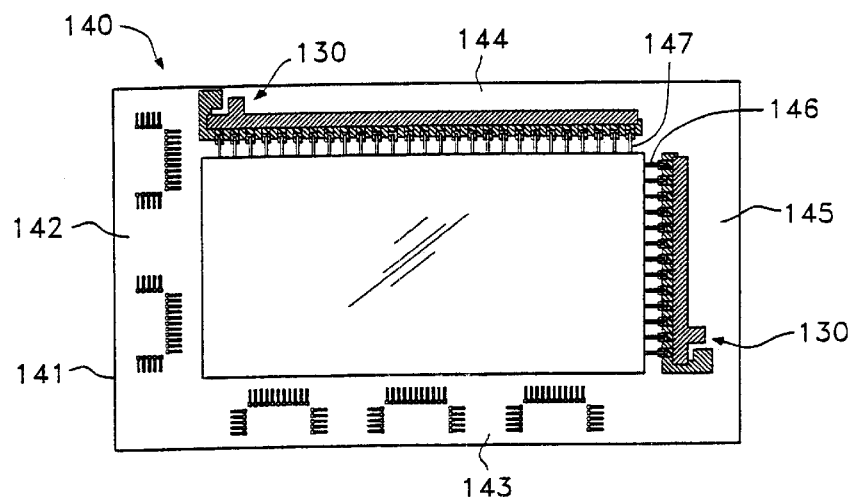
Fig. 7A
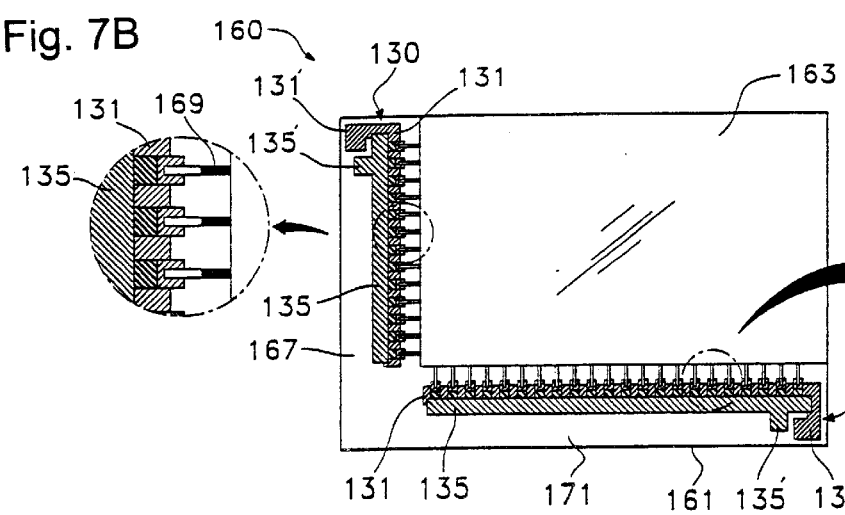
Fig. 7B
Fig. 7C
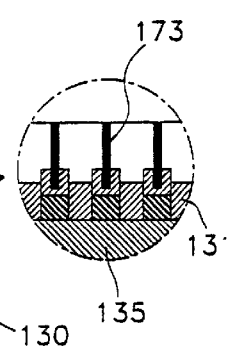

LCD PANELS INCLUDING INTERCONNECTED TEST THIN FILM TRANSISTORS AND METHODS OF GROSS TESTING LCD PANELS

FIELD OF THE INVENTION

This invention relates to liquid crystal display (LCD) panels and more particularly to testing of LCD panels.

BACKGROUND OF THE INVENTION

LCD panels are widely used as flat panel display devices. As is well known to those having skill in the art, an LCD panel includes a pixel region, also known as an active region, which includes an array of pixel thin film transistors and intersecting arrays of spaced apart data lines and gate lines that are connected to the array of pixel thin film transistors. The array of pixel thin film transistors, data lines and gate lines form an array of addressable pixels.

In fabricating LCD panels, a gross test is generally carried out in order to check the operation of the pixels of an LCD panel prior to mounting driver integrated circuit chips to the LCD panel. Thus, defective LCD panels can be identified prior to mounting driver chips to the panel. In order to perform a gross test of the pixels, all of the gate lines and data lines generally are energized so that defective pixels can be readily identified by visual inspection of the panel.

LCD panels may be classified in two general types, depending upon the configuration of driver chips that are mounted on the LCD panel. In one panel type, tape automated bonding (TAB) is used to mount driver chips on the LCD panel. In a second panel type, chip on glass (COG) technology is used to mount driver chips on the LCD panel. Depending on the type of LCD panel, gross testing may be performed differently.

Each of the types of LCD panels, and conventional gross testing thereof will now be described. In general, pin contact testing is applied to TAB LCD panels and conductive rubber pad testing is generally applied to COG technology.

FIG. 1 illustrates a conventional LCD panel using TAB mounting technology. In TAB mounting technology, the LCD panel is connected to the TAB driver chips using a conductive film. The TAB driver chips are generally connected to a printed circuit board. Referring now to FIG. 1, an LCD panel 10 includes a substrate 11 such as a glass substrate including a pixel region 13. As already described, the pixel region 13 includes therein an array of pixel thin film transistors and intersecting arrays of spaced apart data lines and gate lines connected to the array of pixel thin film transistors. In the LCD panel of FIG. 1, the gate lines extend horizontally and the data lines extend vertically. A color filter substrate may be included on the glass substrate 11. The color filter substrate may include color filter patterns.

Still referring to FIG. 1, the gate lines 15 extend outside the pixel region 13 to a gate line area 17 on substrate 11. As shown, the gate lines may extend outside the pixel region at opposite sides thereof. Similarly, the data lines 19 extend outside the pixel regions 13 into a data line area 21. The data lines 19 may also extend beyond the pixel region at the opposite side thereof.

In order to perform a gross test on the LCD panel 10, respective ends of the gate lines 15 are connected to a gate contact line 23 in the gate line area 17. Similarly, the respective ends of the data lines 19 are connected to a data contact line 25 in the data line area 21. Voltage is supplied to the gate lines 15 and the data lines 19 through the gate contact line 23 and the data contact line 25 during the gross test. A gate pin contact pad 24 and a data pin contact pad 26 are respectively formed at the ends of the gate contact line 23 and the data contact line 25. Probes from a test fixture contact the respective contact pads 24 and 26 during testing.

In order to test the LCD panel 10, power is supplied to the gate contact line 23 and the data contact line 25 by contacting probes from a test fixture to the gate pin contact pad 24 and the data pin contact pad 26. When power is applied to the gate pin contact pad 24 and the data pin contact pad 26, current flows through all of the gate lines 15 and all of the data lines 19. This causes all of the pixel thin film transistors in the array to be energized to thereby activate all of the pixels. For example, for an LCD panel that is normally white, all of the pixels will change to black. Conversely, for an LCD panel that is normally black, all of the pixels will change to white. If there is a defect in the data lines, gate lines or any of the pixel thin film transistors in the array, one or more of the pixels will remain in its original state. It is therefore possible to visually discriminate good LCD panels from defective LCD panels by monitoring the displayed state of the pixels.

After completion of the gross test, it is generally desirable to be able to address each of the data lines and gate lines individually for normal operation. Accordingly, the gate contact line 23 and the data contact line 25 are removed from the substrate 11 prior to attaching the driver chips in the gate area 17 and the data area 21. Glass cutting may be used to cut the substrate 11 along dashed lines 27 to remove the portion of the substrate including the gate contact line 23, gate pin contact pad 24, data contact line 25 and data pin contact pad 26. Alternatively, laser cutting may be used to cut the data lines 19 and the gate lines 15 in the data line area 21 and the gate line area 17 respectively, to thereby electrically disconnect the data contact line 25 and the gate contact line 23 from the data lines 19 and gate lines 15, respectively.

Unfortunately, each of these cutting operations may adversely impact the LCD panel. More specifically, when using the glass cutting, glass particles may contaminate the LCD panel. Laser cutting may be slower and more expensive so that increased cost may result. Moreover, both of these operations use additional mechanical steps to physically disconnect the gate contact line 23 and the data contact line 25 from the gate lines 15 and the data lines 19, respectively. These additional operations can result in decreased yields for the LCD panels, and in increased costs.

Gross testing of COG LCD panels will now be described. As shown in FIG. 2A, a conventional COG LCD panel 30 includes a substrate 31 and a pixel region 33 as already described. A color filter substrate may also be attached to the glass substrate 31. A gate line area 35 is provided outside the pixel region 33 and a data line area 37 is provided outside the pixel region 33. In gate line area 35, a plurality of gate lines 39 end in multi-sided subgroups of gate lines. In FIG. 2A, two multi-sided subgroups of gate lines are shown however it will be recognized that more subgroups may be provided. One or more gate driver chips may be attached to a multi-sided gate line subgroup.

Similarly, in the data line area 37 a plurality of data lines 41 end in a plurality of multi-sided data line subgroups. Four multi-sided subgroups are shown in data line area 37, but fewer or more subgroups can be used. Driver chips are attached to the data lines in the multi-sided subgroups. As also shown in FIGS. 2A–2B, bonding pads 43 are generally formed at the ends of the data lines 41 and gate lines 39 to facilitate bonding of the chips to the bonding pads 43.

A test apparatus or fixture for performing gross tests on the LCD panel 30 of FIG. 2A generally uses spaced apart conductive rubber pads to simultaneously energize the bonding pads 43. A schematic prospective view of a gross test fixture for testing the LCD panel of FIG. 2A is shown in FIG. 3.

As shown in FIG. 3, the test fixture 50 includes a base 51 having a recessed portion 58. Printed circuit boards 53 project from the bottom of the recessed portion 58 of the base 51 to support and test the LCD panel 30. Guide projections 55 are formed along the edges of the printed circuit boards 53, to hold the LCD panel 30 in place between the printed circuit boards 53.

Still referring to FIG. 3, conductive rubber pads 57 are attached to the tops of the printed circuit boards 53. The conductive rubber pads 57 are arranged in spaced apart relation corresponding to the multi-sided subgroups 39 of gate lines 39 and data lines 41 in the gate line area 35 and the data line area 37, respectively. A power source 59 is connected to the printed circuit boards 53 so that the conductive rubber pads 57 can be supplied with power.

A hinged cover 63 covers the base 51 during the gross tests. A projection 65 is formed on the bottom of the cover 63. The projection 65 contacts the substrate 31 and presses the conductive rubber pads 57 into contact with the multi-sided subgroups of gate lines and data lines when the cover is closed.

Accordingly, in order to provide a gross test of a COG LCD panel, the LCD panel 30 is loaded onto the printed circuit boards 53. The gate lines 39 and the data lines 41 of the LCD panel 30 contact the conductive rubber pads 57 on the tops of the printed circuit boards 53. The hinged cover 63 is closed. The projection 65 presses the LCD panel 30 so that the gate lines 39 and data lines 41 are tightly coupled to the conductive rubber pads 57.

When voltage is supplied to the conductive rubber pads 57, conductive particles in the conductive rubber pads are supplied with the voltage. As a result, all of the gate lines 39 and data lines 41 in contact with the conductive particles are also energized. This causes the pixels of the LCD panel to change from their unenergized state, for example white, to their energized state, for example black. If any of the data lines, gate lines or pixel thin film transistors are defective, the corresponding pixels will not be energized and will not change color. An operator can thereby determine the quality of the LCD panel by visual inspection.

Unfortunately, the gross test of LCD panels using the conductive rubber pads may be prone to errors. In particular, if any of the gate lines 39 or data lines 41 does not electrically contact a conductive particle in the conductive rubber pad 57, the LCD panel may appear to be defective upon visual inspection, even though it is not in fact defective. A high resolution LCD panel has large numbers of gate lines 39 and data lines 49, and the distance between the lines can be very small. The distance between the conductive particles in the conductive rubber pads may be larger than the distance between adjacent gate lines or data lines. Moreover, the number of conductive particles may be limited. Accordingly, it is possible that a data line or a gate line does not contact a conductive particle.

If a data line or gate line is between the conductive particles, the line will not be energized and the associated pixels will not change color. Accordingly, on visual inspection, the LCD panel will appear defective even though it is not defective.

SUMMARY OF THE INVENTION

It is therefore an object of the present invention to provide improved LCD panels and methods of gross testing thereof.

It is another object of the present invention to provide improved LCD panels which do not require physical disconnection of elements in the gate line area or data line area after gross testing.

It is yet another object of the present invention to provide LCD panels and gross testing methods therefor which do not require the use of conductive rubber pads for gross testing.

It is still another object of the present invention to provide LCD panels and gross testing methods therefor which can reduce the possibility of a good LCD panel from appearing defective in a gross test.

These and other objects are provided according to the present invention by providing a plurality of test thin film transistors outside the pixel region of an LCD panel that includes an array of pixel thin film transistors and intersecting arrays of spaced apart data lines and gate lines connected to the array of pixel thin film transistors. A respective test thin film transistor is connected to a respective one of the data lines or gate lines. At least subgroups of the test thin film transistors are commonly connected to provide common energization of subgroups of data lines or gate lines for gross testing of the LCD panels.

By providing test thin film transistors outside the pixel region, and commonly connecting at least subgroups of data lines or test lines, the commonly connected subgroups can be energized for gross testing of the LCD panel. Rubber pads are not required to energize each individual data line or gate line because the commonly connected subgroups of test thin film transistors can be energized as a unit. Moreover, after testing is completed, the test thin film transistors need not be disconnected. Rather, they simply need not be energized after the gross test. The unenergized test thin film transistors act as a high impedance that isolates the data lines and test lines from one another as if they were not interconnected by the test transistors. Accordingly, efficient testing of LCD panels may be provided, without the need to physically cut lines after testing and without the possibility of introducing errors by high density conductive rubber pad contacts to each of the data lines and gate lines.

In one embodiment of the present invention, which is particularly suitable for tape automated bonding (TAB) LCD panels, all the test thin film transistors that are connected to data lines are commonly connected to provide common energization of all data lines, and all the test thin film transistors that are connected to gate lines are commonly connected to provide common energization of all gate lines. In another embodiment which may be particularly suitable for chip on glass (COG) LCD panels, subgroups of the test thin film transistors that are connected to subgroups of data lines are commonly connected to provide common energization of subgroups of data lines and subgroups of the test thin film transistors that are connected to subgroups of gate lines are commonly connected to provide common energization of subgroups of gate lines.

LCD panels as described above may be used with a test fixture that energizes all the test thin film transistors that are commonly connected to data lines and energizes all the test thin film transistors that are commonly connected to gate lines. Alternatively, the test fixture energizes all the subgroups of test thin film transistors that are commonly connected to gate lines.

More specifically, according to the present invention, LCD panels comprise a pixel region and a plurality of test thin film transistors outside the pixel region. The pixel region includes an array of pixel thin film transistors and intersecting arrays of spaced apart data lines and gate lines connected to the array of pixel thin film transistors. Each test thin film transistor includes a source, a drain and a gate. One of the source and drain of a respective test thin film transistor is connected to a respective one of the data lines or gate lines. The other of the sources and drains of the test thin film transistors are commonly connected. The gates of the test thin film transistors are commonly connected.

In a specific embodiment, the drain of a respective test thin film transistor is connected to a respective one of the gate lines, the sources of the test thin film transistors are commonly connected and the gates of the test thin film transistors are commonly connected. Respective drains of the remaining test thin film transistors are connected to a respective one of the data lines. The sources of the remaining test thin film transistors are commonly connected and the gates of the test thin film transistors are commonly connected. This configuration is particularly useful for testing of TAB LCD panels.

In another embodiment, the drain of a respective test thin film transistors is connected to a respective one of the gate lines, the sources of subgroups of the test thin film transistors are commonly connected to provide a plurality of common source connections and the gates of subgroups of the test thin film transistors are commonly connected to provide a plurality of common gate connections. The drains of others of the respective test thin film transistors are connected to a respective one of the data lines. The sources of the subgroups of the test thin film transistors are commonly connected to provide a plurality of common source connections and the gates of the subgroups of the test thin film transistors are commonly connected to provide a plurality of common gate connections.

Even more specifically, in one embodiment each of the gate lines includes first and second ends and the drain of a respective test thin film transistor is connected to the first end of a respective one of the gate lines. Each of the data lines includes first and second ends and the drain of a respective test thin film transistor is connected to the first end of a respective one of the data lines. Each of the gate lines can include a bonding pad at the first end thereof, and the drain of a respective test thin film transistor is connected to the bonding pad of the first end of a respective one of the gate lines. Similarly, each of the data lines can include a bonding pad at the first end thereof, and the drain of a respective test thin film transistor is connected to the bonding pad of the first end of a respective one of the data lines.

The bonding pads may be arranged in a row at the first ends for tape automated bonding of gate driver chips thereto or may be arranged in multi-sided groups at the first ends of the gate lines for chip on glass mounting of gate driver chips thereto. Similar arrangements may be provided for the data lines for tape automated bonding of data driver chips or for chips on glass mounting of data driver chips thereto. In yet another alternative, each of the gate lines and data lines includes a bonding pad at the first end thereof, and the drain of a test of a respective test thin film transistor is connected to the second end of a respective one of the gate lines or data lines.

In the TAB embodiments described above, the sources of the test thin film transistors that are connected to the gate lines can be commonly connected to a first gate probe contact and the gates of these test thin film transistors can be commonly connected to a second gate probe contact. Similar connections may be provided for the test thin film transistors connected to the data lines using a first data probe contact and a second data probe contact. In the COG LCD panels, a plurality of first gate probe contacts and a plurality of second gate probe contacts may be provided wherein the sources of subgroups of the test thin film transistors are commonly connected to a respective one of the first gate probe contacts to provide a plurality of common source connections and the gates of subgroups of the test thin film transistors are commonly connected to a respective one of the second gate probe contacts to provide a plurality of common gate connections. A plurality of first and second data probe contacts may also be provided.

LCD panels as described above may be gross tested by contacting the LCD panels by a test fixture. The test fixture energizes the first and second gate probe contacts and the first and second data probe contacts in the TAB embodiment. The test fixture energizes the plurality of first and second gate probe contacts and the plurality of first and second data probe contacts in the COG embodiment. High density conductive rubber pads are not required and physical disconnection of test structures need not be provided after gross testing.

Methods are also provided, according to the present invention, for gross testing an LCD panel comprising a pixel region including an array of pixel thin film transistors and intersecting arrays of spaced apart data lines and gate lines connected to the array of pixel thin film transistors. The LCD panel is tested by fabricating a plurality of test thin film transistors outside the pixel region, a respective one of which is connected to a respective one of the data lines or gate lines, wherein at least subgroups of the test thin film transistors are commonly connected. The subgroups of the test thin film transistors that are commonly connected are then energized.

In one embodiment, all the test thin film transistors that are connected to data lines are commonly connected and all the test thin film transistors that are connected to gate lines are commonly connected. In this embodiment, the energizing step comprises the step of energizing the commonly connected test thin film transistors that are connected to all data lines and energizing the commonly connected test thin film transistors that are connected to all gate lines. This embodiment may be used to test TAB LCD panels.

In another embodiment, subgroups of the test thin film transistors that are connected to data lines are commonly connected and subgroups of the test thin film transistors that are connected to gate lines are commonly connected. In this embodiment, the energizing step comprises the step of energizing the subgroups of commonly connected test thin film transistors that are connected to data lines and energizing the subgroups of commonly connected test thin film transistors that are connected to gate lines. This embodiment may be used with COG LCD panels.

The energizing step is preferably performed by a test fixture. In the TAB embodiment, at least first and second test probes are included at locations corresponding to the commonly connected test thin film transistors that are connected to all data lines and the commonly connected test thin film transistors that are connected to all gate lines. In the COG embodiment a least first and second groups of probes are included in the test figure fixture at locations corresponding to the subgroups of commonly connected test thin film transistors that are connected to data lines and the subgroups of commonly connected test thin film transistors that are connected to gate lines.

In fabricating the LCD panels, the array of pixel thin film transistors and plurality of test thin film transistors are preferably fabricated simultaneously using common fabrication steps. The source, drain and gate connections of the test thin film transistors may be provided as was already described. Accordingly, high speed, reliable gross testing of LCD panels may be provided.

BRIEF DESCRIPTION OF THE DRAWINGS

FIG. 1 is a top view of a conventional TAB LCD panel.

FIGS. 2A–2B are top views of a conventional COG LCD panel.

FIG. 4A is a top view of COG LCD panels according to the present invention.

FIG. 4B is a top view of test thin film transistors for gate lines of LCD panels of FIG. 4A.

FIG. 4D is a top view of test thin film transistors for data lines of LCD panels of FIG. 4A.

FIG. 5 is a top view of another embodiment of COG LCD panels according to the present invention.

FIGS. 7A–C are top views of TAB LCD panels according to the present invention.

DETAILED DESCRIPTIONS OF PREFERRED EMBODIMENTS

Figure 3:
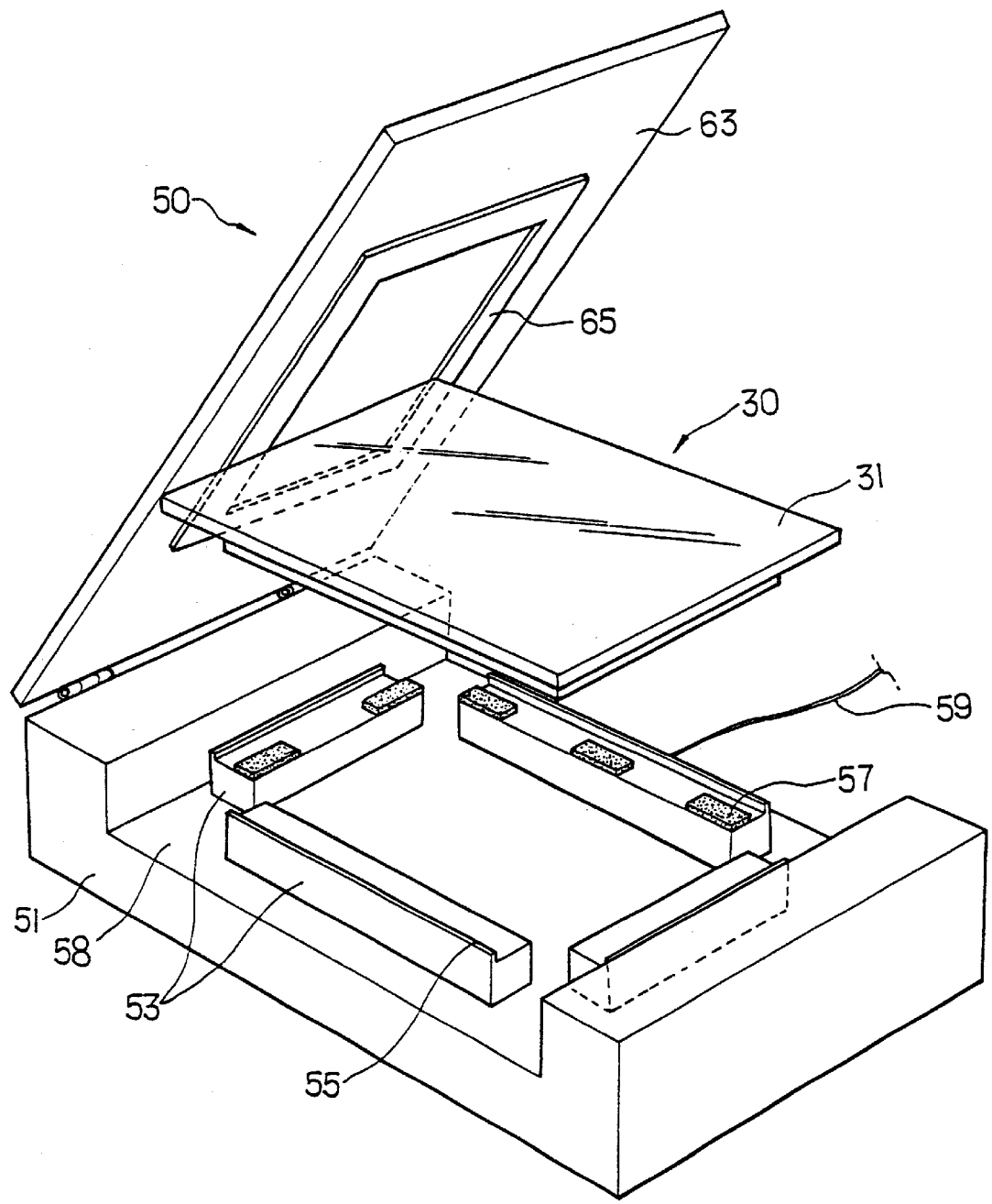
FIG. 3 is a perspective view of a fixture for testing LCD panels of FIG. 2.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will also be understood that when a layer is referred to as being "on" another layer or substrate, it can be directly on the other layer or substrate, or intervening layers may also be present.

FIG. 4A is a schematic top view of a COG LCD panel according to the present invention. As shown in FIG. 4A, LCD panel 100 includes a substrate 101 having a pixel region 103. The pixel region includes an array of pixel thin film transistors and intersecting arrays of spaced apart data lines and gate lines connected to the array of pixel thin film transistors. The design of these pixel thin film transistors and arrays of spaced apart data lines and gate lines is well known to those having skill in the art and need not be described further herein. A color substrate may also be provided on pixel region 103. Color filter patterns may be formed in the color filter substrate.

Still referring to FIG. 4A, the LCD panel 100 includes a gate line area 105 outside the pixel region 103 and a data line area 107 outside the pixel region 103. A plurality of test thin film transistors are provided in the gate line area 105 and in the data line area 107 outside pixel region 103. Each test thin film transistor includes a source, a drain and a gate. As will be described in detail below, one of the source and drain of the respective test thin film transistor is connected to a respective one of the data lines or gate lines. The other of the sources and drains of the test thin film transistors are commonly connected and the gates of the test thin film transistors are commonly connected.

In the gate line area 105 of the COG LCD panel of FIG. 4A, the gate lines are arranged in a plurality of multi-sided subgroups 110. As shown in FIG. 4A, two subgroups 110 are provided in the gate line area 105. In the data line area 107, the data lines are arrayed in a plurality of multi-sided subgroups 120. As shown in FIG. 4A, four subgroups are provided in the data line area. However, different numbers of subgroups 110 and 120 may be provided. Driver chips are attached to each of the subgroups 110, 120 after testing.

Referring now to FIG. 4B, the details of one subgroup 110 of test thin film transistors in the gate line area 105 of LCD panel 100 is illustrated. As shown, a subgroup of gate lines 111 extend in a multi-sided subgroup in gate line area 105. A bonding pad 113 is included at the end of each gate line 111. As shown, the bonding pads 113 are arranged in a multi-sided group for chip on glass mounting of gate driver chips thereto.

A gate line extension 111' extends from each bonding pad 113. Preferably the gate lines 111 are formed of aluminum or chrome, and the gate line extensions 111' from the bonding pads 113 are formed of indium tin oxide (ITO). Similar subgroups 120 are formed in data line area 107. As shown in FIG. 4D, the data lines 121 end in multi-sided subgroups and include a bonding pad 123 at each end thereof for bonding of a data driver chip thereto. Bonding pad extensions 121' are also provided.

Figure 4C:
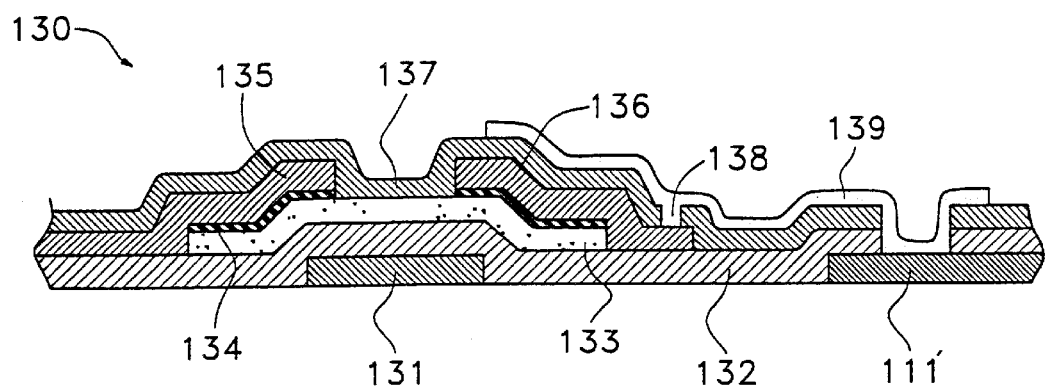
FIG. 4C is a cross-sectional view taken along the lines 4C–4C' of FIG. 4B.

Referring again to FIGS. 4B and 4D, a plurality of test thin film transistors are provided. A respective test thin film transistor is connected to a respective gate line bonding pad 113 or data line bonding pad 123. As will be described in more detail in connection with FIGS. 4C and 4E, each test thin film transistor includes a drain that is connected to a respective one of the gate lines 111 or the data lines 121 via the respective bonding pads 113 or 123. The sources of the test thin film transistors are commonly connected by source electrode 135 and the gates of the test thin film transistors are commonly connected by a gate electrode 131. The source electrodes 135 of the test thin film transistors are preferably commonly connected to a source probe contact 135' and the gate electrodes 131 are commonly connected to a gate probe contact 131'. In FIG. 4D, the data lines 121, the extended data lines 121' and the bonding pads 123 are preferably formed of the same material.

Figure 4E:
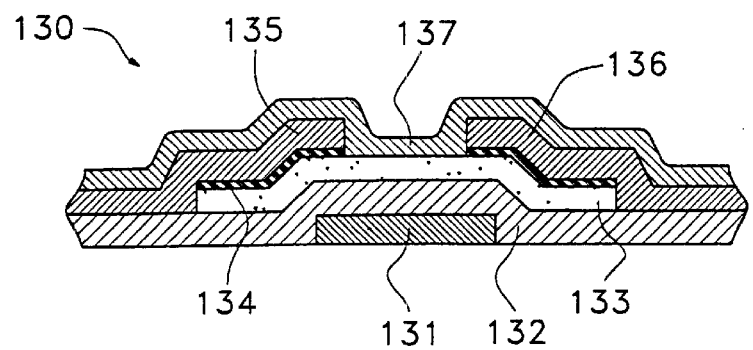
FIG. 4E is a cross-sectional view along the lines 4E–4E' of FIG. 4D.

FIGS. 4C and 4E are cross-sectional illustrations of the test thin film transistors 130 in the gate line area of FIG. 4C and the data line area of FIG. 4D. As shown, each test thin film transistor includes a gate electrode 131, an insulating layer 132, an amorphous silicon layer 133, source and drain electrodes 135 and 136, respectively, and a protective layer 137. The test thin film transistors 130 are preferably formed at the same time as the array of pixel thin film transistors. It will be understood that the designations of the source and drain regions may be reversed.

It will also be understood by those having skill in the art that FIGS. 4A–4E illustrate that the bonding pads 113 and 123 are arranged at first ends of the gate lines 111 and data lines 121 respectively, and the test thin film transistors are also included at the first end of the gate lines and data lines. However, the test thin film transistors 130 may also be included at the second end of the gate lines 111 and data lines 121, opposite the bonding pads 113 and 123, respectively. This arrangement at opposite ends may be especially advantageous if there is not enough room to mount the driver chips and form the test thin film transistors at the first ends of the data lines and the gate lines. One such arrangement will be described in connection with FIG. 5 below.

Figure 6A:
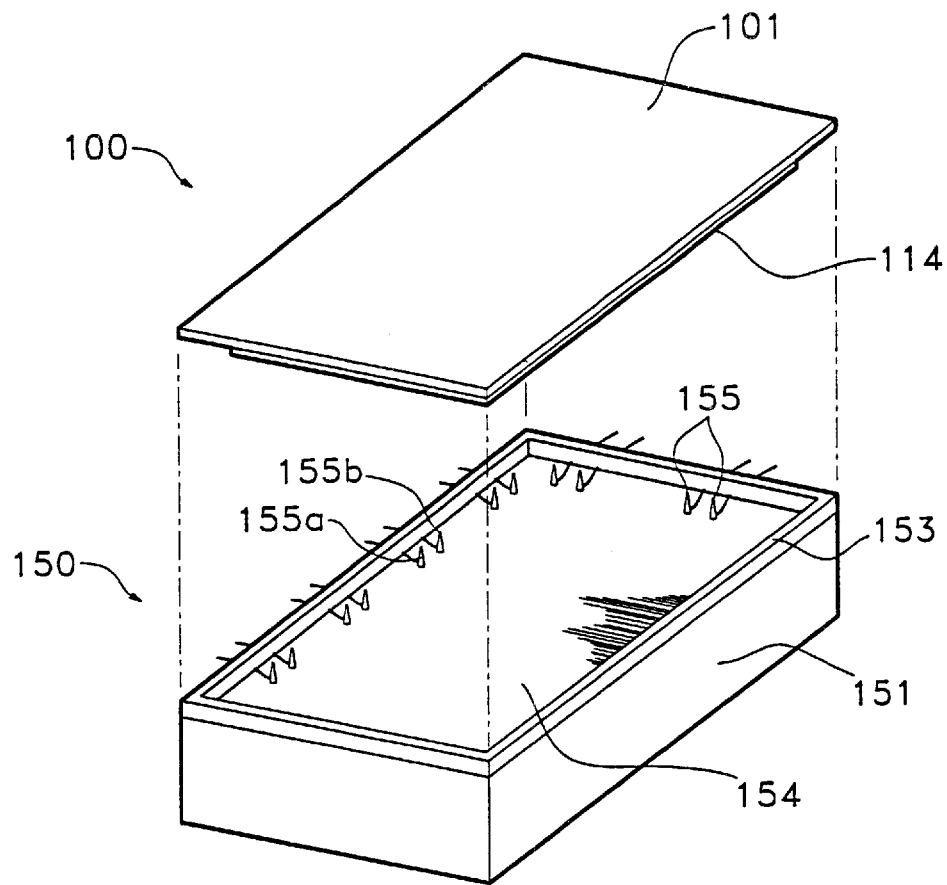
FIG. 6A is a perspective view of a test fixture for testing LCD panels according to the present invention.
Figure 6B:
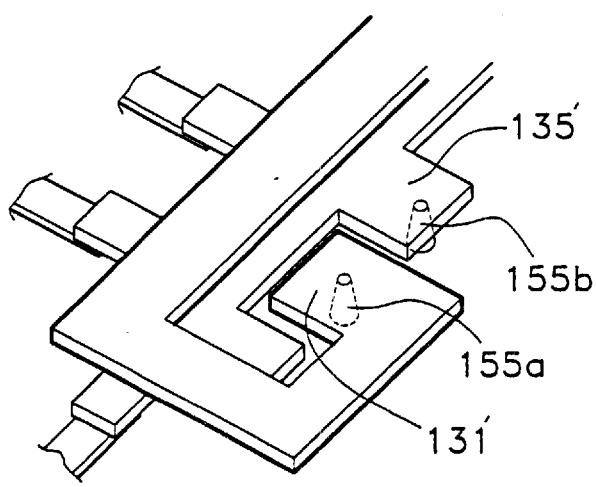
FIG. 6B is a perspective view of probes of the gross test apparatus in contact with gate pin contact pads and data pin contact pads.

Referring now to FIGS. 6A and 6B, a gross test apparatus, also referred to as a test fixture, for performing gross testing of LCD panels of FIGS. 4A–4E will now be described. As shown in FIG. 6A, the gross test fixture 150 includes a base plate 151 which supports an LCD panel 100. A guide projection 153 is included at the edge of the top of the base plate 151 and fixedly holds the LCD panel 100 in place. A recessed portion 154 is formed in the base plate 151. The color filter 114 of the LCD panel may fit within the recessed portion 154.

At the bottom of the recessed portion 154, a plurality of probes 155 are included. A plurality of first probes 155b are located at positions corresponding to source probe contacts 135' of FIG. 4B. A plurality of second probes 155a are located at positions corresponding to the plurality of gate probe contacts 131'. Accordingly, as illustrated in FIG. 6B, when LCD panel 100 is placed on test fixture 150, a corresponding first probe contact 15b electrically contacts the gate probe contact and a plurality of second probe contacts 155a electrically contacts the source probe contacts 135'. Power is supplied to the gate probe contacts 131' and source probe contacts 135' for use in gross testing of the LCD panel 100.

Referring again to FIGS. 4C and 4E, methods for fabricating test thin film transistors according to the present invention, in the gate line area 105 and in the data line area 107 respectively, of FIG. 4A, will now be described. Preferably, the test thin film transistors 130 are formed simultaneously with the array of pixel thin film transistors in the pixel region 103 of the LCD panel. For ease of description, however, only the fabrication of the test thin film transistors 130 will be described.

Referring to FIGS. 4C and 4E, a conductor such as metal is deposited on the substrate 101 and is etched using a mask to form the gate lines 111 and simultaneously form a commonly connected gate electrode 131 for the test thin film transistors in spaced apart relation from the gate lines 111. The gate line extensions 111' and the source line extensions 121' are also formed simultaneously.

Then, silicon nitride is deposited on the surface of the gate electrode 131 to form an insulating layer 132. Then, hydrogenated amorphous silicon (a-Si:H) 133 and n+ hydrogenated amorphous silicon layers 134 are successively applied to the surface of the insulating layer 132. The n+ hydrogenated amorphous silicon layer 134 is etched to form source and drain regions and the hydrogenated amorphous silicon layer 133 is also etched to form a channel region between the source and drain regions 134.

A conductive layer such as a metal layer is then deposited and etched to form source and drain electrodes 135 and 136 respectively. The data lines may also be formed simultaneously. After forming the source/drain electrodes 135 and 136, the n+ hydrogenated amorphous silicon layer 134 may be etched again using the source and drain electrodes 135 and 136 as a mask to thereby complete the formation of the source and drain regions. A protective layer 137 may then be formed.

Finally, a contact 138 is formed in the protective layer 137 in the gate line area using conventional photolithography. The location of the contact 138 corresponds to the location of the drain electrode 136. An indium tin oxide (ITO) layer is then applied and etched to thereby form ITO layer 139 which is connected to the gate line extension 111'. Thus, the gate lines 111 are connected to the drain electrode of the test thin film transistor 130 via the gate line extensions 111'.

Returning again to FIGS. 6A and 6B, in testing the LCD panels, the LCD panel 100 is loaded on base 151 such that the gate area 105 and the data area 107 of the LCD panel 100 contact the probes 155. More specifically, the gate probe contact 131' which is formed on the gate electrode 131 and the source probe contact 135' which are formed as part of the source electrode 135 electrically contact probes 155a and 155b respectively.

A voltage is supplied to the respective probes to test the pixel region of the LCD panel 100. The voltage supplied to the source probe contact 135' flows to the drain electrode 136 through the semiconductor layer 133. The voltage supplied to the gate probe contact 131' controls the current flowing between the source and drain electrodes 135 and 136.

Accordingly, it is possible to supply a suitable voltage to gate lines 111 and data lines 121 during the gross test. By providing the voltage, the appropriate current is provided to gate lines 111 and data lines 121. When all of the gate lines 111 and data lines 121 are energized, all of the pixel thin film transistors in the array of the pixel region are activated. A normally white LCD panel therefore changes to black. However, if any of the gate lines 111, data lines 121 or the pixel thin film transistors in the array are defective, then one or more of the pixel thin film transistors that are not supplied with current will maintain the unenergized state. An operator can readily determine the quality of the LCD panel by visual inspection.

Referring now to FIGS. 7A–C, schematic top views of a TAB LCD panel including test thin film transistors according to the invention are described. As shown in FIGS. 7A–C, LCD panel 160 includes a pixel region 163 including an array of pixel thin film transistors and intersecting arrays of spaced apart data lines and gate lines connected to the array of pixel thin film transistors. The gate lines 169 extend from the pixel region 163 to a gate line area 167. The data lines 173 extend from the pixel region 163 to a data line area 171.

Still referring to FIGS. 7A–C, respective test thin film transistor 130 is connected to a respective one of the gate lines 169 and data lines 173. As shown, source electrode 135 includes a source probe contact 135'. Similarly, the gates of the test thin film transistors 130 are commonly connected to a gate electrode 131 and include a gate probe contact 131'. The design of test thin film transistors 130 were already described and need not be described again here. Accordingly, as shown in FIGS. 7A–C, the drain of a respective test thin film transistor is connected to a respective one of the gate lines 169, the sources 135 are all commonly connected and the gates 131 of the test thin film transistors are all commonly connected. Similar connections are provided for the test thin film transistors in the data line area 171. Thus, gross testing may be provided by connecting the two gate probe contacts 131' and the two source probe contacts 135' to suitable voltages using two pairs of probes in a test fixture.

FIG. 5 is a schematic top view of another embodiment of LCD panels according to the invention. As shown in FIG. 5, LCD panel 140 uses COG techniques for mounting gate and data line drivers, but uses TAB connections for the test thin film transistors. In particular, gate line area 142 of substrate 141 includes a plurality of multi-sides subgroups of gate lines for connecting to gate driver chips. Data area 143 includes a plurality of multi-sided subgroups of data lines for connection to data line driver chips. There may not be enough room in the gate line area 142 and in the data line area 143 for also fabricating the test thin film transistors 130. Accordingly, the test thin film transistors 130 are provided at the opposite ends of the data lines and gate lines, opposite the gate line area 142 and data line area 143. Thus, the opposite ends of gate lines 146 extend into gate line test thin film transistor area 145 and the opposite ends of data lines 147 extend into data line test thin film transistor area 144. The test thin film transistors are included as was already described.

When fabricating LCD panels using TAB technology, the use of the test thin film transistors according to the invention can eliminate the step of cutting the gate lines and/or data lines after the gross test. Accordingly, glass particle contamination can be reduced, cost can be reduced and throughput can be increased. Moreover, for high resolution LCD panels which use COG technology, all of the gate lines and data lines can be energized during a gross test. Accordingly, there is a reduced likelihood that a good LCD panel will be viewed as being defective during the gross test because a gate line or data line was not supplied with power. Accordingly, the yield of the LCD panels can be increased.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An LCD panel comprising:
   a pixel region including an array of pixel thin film transistors and intersecting arrays of spaced apart data lines and gate lines connected to the array of pixel thin film transistors; and
   a plurality of test thin film transistors outside the pixel region, each test thin film transistor including a source, a drain and a gate, one of the source and drain of a respective test thin film transistor being connected to a respective one of the data lines or gate lines, the other of the sources and drains of the test thin film transistors being commonly connected and the gates of the test thin film transistors being commonly connected.

2. An LCD panel according to claim 1 wherein the drain of a respective test thin film transistor is connected to a respective one of the gate lines, the sources of the test thin film transistors are commonly connected and the gates of the test thin film transistors are commonly connected.

3. An LCD panel according to claim 2 wherein each of the gate lines includes first and second ends, and wherein the drain of a respective test thin film transistor is connected to the first end of a respective one of the gate lines.

4. An LCD panel according to claim 3 wherein each of the gate lines includes a bonding pad at the first end thereof, and wherein the drain of a respective test thin film transistor is connected to the bonding pad at the first end of a respective one of the gate lines.

5. An LCD panel according to claim 4 wherein the bonding pads are arranged in a row at the first ends of the gate lines for tape automated bonding of gate driver chips thereto.

6. An LCD panel according to claim 4 wherein the bonding pads are arranged in multi-sided groups at the first ends of the gate lines for chip on glass mounting of gate driver chips thereto.

7. An LCD panel according to claim 3 wherein each of the gate lines includes a bonding pad at the first end thereof, and wherein the drain of a respective test thin film transistor is connected to the second end of a respective one of the gate lines.

8. An LCD panel according to claim 2 further comprising a first gate probe contact and a second gate probe contact and wherein the sources of the test thin film transistors are commonly connected to the first gate probe contact and the gates of the test thin film transistors are commonly connected to the second gate probe contact.

9. An LCD panel according to claim 8 in combination with a test fixture that energizes the first and second gate probe contacts to thereby energize the array of pixel thin film transistors for gross testing.

10. An LCD panel according to claim 1 wherein the drain of a respective test thin film transistor is connected to a respective one of the data lines, the sources of the test thin film transistors are commonly connected and the gates of the test thin film transistors are commonly connected.

11. An LCD panel according to claim 10 wherein each of the data lines includes first and second ends, and wherein the drain of a respective test thin film transistor is connected to the first end of a respective one of the data lines.

12. An LCD panel according to claim 11 wherein each of the data lines includes a bonding pad at the first end thereof, and wherein the drain of a respective test thin film transistor is connected to the bonding pad at the first end of a respective one of the data lines.

13. An LCD panel according to claim 12 wherein the bonding pads are arranged in a row at the first ends of the data lines for tape automated bonding of data driver chips thereto.

14. An LCD panel according to claim 12 wherein the bonding pads are arranged in multi-sided groups at the first ends of the data lines for chip on glass mounting of data driver chips thereto.

15. An LCD panel according to claim 11 wherein each of the data lines includes a bonding pad at the first end thereof, and wherein the drain of a respective test thin film transistor is connected to the second end of a respective one of the data lines.

16. An LCD panel according to claim 1 wherein the drain of a respective test thin film transistor is connected to a respective one of the gate lines, the sources of subgroups of the test thin film transistors are commonly connected to provide a plurality of common source connections and the gates of subgroups of the test thin film transistors are commonly connected to provide a plurality of common gate connections.

17. An LCD panel according to claim 16 further comprising a plurality of first gate probe contacts and a plurality of second gate probe contacts wherein the sources of subgroups of the test thin film transistors are commonly connected to a respective one of the first gate probe contacts to provide a plurality of common source connections and the gates of subgroups of the test thin film transistors are commonly connected to a respective one of the second gate probe contacts to provide a plurality of common gate connections.

18. An LCD panel according to claim 17 in combination with a test fixture that energizes the plurality of first and second gate probe contacts to thereby energize the array of pixel thin film transistors for gross testing.

19. An LCD panel according to claim 1 wherein the drain of a respective test thin film transistor is connected to a respective one of the data lines, the sources of subgroups of the test thin film transistors are commonly connected to provide a plurality of common source connections and the gates of subgroups of the test thin film transistors are commonly connected to provide a plurality of common gate connections.

20. An LCD panel according to claim 10 further comprising a first data probe contact and a second data probe contact and wherein the sources of the test thin film transistors are commonly connected to the first data probe contact and the gates of the test thin film transistors are commonly connected to the second data probe contact.

21. An LCD panel according to claim 20 in combination with a test fixture that energizes the first and second data probe contacts to thereby energize the array of pixel thin film transistors for gross testing.

22. An LCD panel according to claim 19 further comprising a plurality of first data probe contacts and a plurality of second data probe contacts wherein the sources of subgroups of the test thin film transistors are commonly connected to a respective one of the first data probe contacts to provide a plurality of common source connections and the gates of subgroups of the test thin film transistors are commonly connected to a respective one of the second data probe contacts to provide a plurality of common gate connections.

23. An LCD panel according to claim 22 in combination with a test fixture that energizes the plurality of first and second data probe contacts to thereby energize the array of pixel thin film transistors for gross testing.

24. A method of gross testing an LCD panel comprising a pixel region including an array of pixel thin film transistors and intersecting arrays of spaced apart data lines and gate lines connected to the array of pixel thin film transistors, the testing method comprising the steps of:
  fabricating a plurality of test thin film transistors outside the pixel region, each test thin film transistor including a source, a drain and a gate, one of the source and drain of a respective test thin film transistor being connected to a respective one of the data lines or gate lines, the other of the sources and drains of the test thin film transistors being commonly connected and the gates of the test thin film transistors being commonly connected; and
  energizing the commonly connected other of the sources and drains of the test thin film transistors and the commonly connected gates of the pixel thin film transistors to thereby energize the array of pixel thin film transistors and provide gross testing of the LCD panel.

25. A method according to claim 24:
  wherein the drain of a respective test thin film transistor is connected to a respective one of the gate lines, the sources of the test thin film transistors are commonly connected and the gates of the test thin film transistors are commonly connected; and
  wherein the energizing step comprises the step of energizing the commonly connected sources and the commonly connected gates.

26. A method according to claim 25:
  wherein the fabricating step further comprises the step of fabricating a first gate probe contact and a second gate probe contact, wherein the sources of the test thin film transistors are commonly connected to the first gate probe contact and the gates of the test thin film transistors are commonly connected to the second gate probe contact; and
  wherein the energizing step comprises the step of energizing the first gate probe contact and the second gate probe contact.

27. A method according to claim 26 wherein the energizing step is performed by a test fixture including first and second gate probes at locations corresponding to the first and second gate probe contacts to thereby energize the array of pixel thin film transistors for gross testing.

28. A method according to claim 24:
  wherein the drain of a respective test thin film transistor is connected to a respective one of the data lines, the sources of the test thin film transistors are commonly connected and the gates of the test thin film transistors are commonly connected; and
  wherein the energizing step comprises the step of energizing the commonly connected sources and the commonly connected gates.

29. A method according to claim 28:
  wherein the fabricating step further comprises the step of fabricating a first data probe contact and a second data probe contact, wherein the sources of the test thin film transistors are commonly connected to the first data probe contact and the gates of the test thin film transistors are commonly connected to the second data probe contact; and
  wherein the energizing step comprises the step of energizing the first data probe contact and the second data probe contact.

30. A method according to claim 29 wherein the energizing step is performed by a test fixture including first and second data probes at locations corresponding to the first and second data probe contacts to thereby energize the array of pixel thin film transistors for gross testing.

31. A method according to claim 24:
  wherein the drain of a respective test thin film transistor is connected to a respective one of the gate lines, the sources of subgroups of the test thin film transistors are commonly connected to provide a plurality of common source connections and the gates of subgroups of the test thin film transistors are commonly connected to provide a plurality of common gate connections; and
  wherein the energizing step comprises the step of energizing the common source connections and the common gate connections.

32. A method according to claim 31:
  wherein the fabricating step further comprises the step of fabricating a plurality of first gate probe contacts and a plurality of second gate probe contacts wherein the sources of subgroups of the test thin film transistors are commonly connected to a respective one of the first gate probe contacts to provide a plurality of common source connections and the gates of subgroups of the test thin film transistors are commonly connected to a respective one of the second gate probe contacts to provide a plurality of common gate connections; and
  wherein the energizing step comprises the step of energizing the plurality of first gate probe contacts and the plurality of second gate probe contacts.

33. A method according to claim 32 wherein the energizing step is performed by a test fixture including a plurality of first and second gate probes at locations corresponding to the plurality of first and second gate probe contacts to thereby energize the array of pixel thin film transistors for gross testing.

34. A method according to claim 24:
  wherein the drain of a respective test thin film transistor is connected to a respective one of the data lines, the sources of subgroups of the test thin film transistors are commonly connected to provide a plurality of common source connections and the gates of subgroups of the test thin film transistors are commonly connected to provide a plurality of common gate connections; and wherein the energizing step comprises the step of energizing the common source connections and the common gate connections.

35. A method according to claim 34:

wherein the fabricating step further comprises the step of fabricating a plurality of first data probe contacts and a plurality of second data probe contacts wherein the sources of subgroups of the test thin film transistors are commonly connected to a respective one of the first data probe contacts to provide a plurality of common source connections and the gates of subgroups of the test thin film transistors are commonly connected to a respective one of the second data probe contacts to provide a plurality of common gate connections; and wherein the energizing step comprises the step of energizing the plurality of first data probe contacts and the plurality of second data probe contacts.

36. A method according to claim 35 wherein the energizing step is performed by a test fixture including a plurality of first and second data probes at locations corresponding to the plurality of first and second data probe contacts to thereby energize the array of pixel thin film transistors for gross testing.

37. A method according to claim 24 wherein the energizing step is performed by a test fixture.

38. A method according to claim 24 wherein the array of pixel thin film transistors and the plurality of test thin film transistors are fabricated simultaneously.

* * * * *